United States Patent [19]

Krusche

[11] Patent Number: 4,495,766
[45] Date of Patent: Jan. 29, 1985

[54] CONTROLS FOR HYDROSTATIC SYSTEMS

[75] Inventor: Alfred Krusche, Johannesberg, Fed. Rep. of Germany

[73] Assignee: Linde Aktiengesellschaft, Wiesbaden, Fed. Rep. of Germany

[21] Appl. No.: 325,032

[22] Filed: Nov. 24, 1981

[30] Foreign Application Priority Data

Nov. 24, 1980 [DE] Fed. Rep. of Germany ....... 3044143

[51] Int. Cl.³ .................... F16D 33/00; F16D 33/02
[52] U.S. Cl. ......................................... 60/428; 60/447
[58] Field of Search .................. 60/420, 428, 447; 417/212, 213, 216, 218, 221

[56] References Cited

U.S. PATENT DOCUMENTS

| 2,238,061 | 4/1941 | Kendrick | 103/37 |
|---|---|---|---|
| 3,935,707 | 2/1976 | Murphy et al. | 60/444 |
| 4,017,218 | 4/1977 | Burk et al. | 60/447 |
| 4,203,290 | 5/1980 | Burckardt | 60/420 |

FOREIGN PATENT DOCUMENTS

| 2049884 | 4/1971 | Fed. Rep. of Germany . |
| 2350390 | 7/1974 | Fed. Rep. of Germany . |
| 2700803 | 7/1978 | Fed. Rep. of Germany . |
| 2807565 | 9/1978 | Fed. Rep. of Germany . |
| 133698 | 1/1979 | Fed. Rep. of Germany . |
| 2823559 | 6/1979 | Fed. Rep. of Germany . |

Primary Examiner—Robert E. Garrett
Assistant Examiner—John M. Husar
Attorney, Agent, or Firm—Buell, Ziesenheim, Beck & Alstadt

[57] ABSTRACT

In a control for a hydrostatic drive system with a primary energy source and with an adjustable pump and at least one adjustable consumer of hydrostatic energy and with a pump adjusting piston connected with the adjusting element of the pump and capable of sliding in a pump adjustment cylinder, where the load on the pump adjustment cylinder is regulated by means of a servo control valve, also with a constant pump connected to the drive shaft of the pump, the delivery line of which leads to a restrictor and to which a signal-pressure line is connected in front of the restrictor, where the pressure-signal present in it regulates a relief valve jet, which in turn is located in a control-signal line, the improvement characterized in that an additional restrictor is located in the control-signal line and means are provided for switching the pressure gradient in it to the servo control valve.

8 Claims, 12 Drawing Figures

CONTROLS FOR HYDROSTATIC SYSTEMS

This invention relates to controls for a hydrostatic drive system and particularly to a control for a hydrostatic drive having a primary energy source, an adjustable pump and at least one adjustable consumer of hydrostatic energy, a pump adjusting piston connected with the adjusting element of the pump and capable of moving in a pump adjusting cylinder where the load on the pump adjustment cylinder is regulated by a servo control, a constant pump driven by the same drive shaft as the adjustable pump and delivering fluid to a restrictor and to a signal line connected ahead of the restrictor and to a regulator for a relief valve jet in a control signal line where a restrictor means is provided in the control signal line so that the pressure gradient at the restrictor affects the servo control valve.

The basic form of a control for regulating a hydrostatic drive, dependent on the speed of rotation of its drive shaft, where the dependence is produced by the pressure in front of a restrictor in the delivery line of a constant volume pump is known. It is also old to allow the pressure built up in the delivery stream of a constant volume pump in front of a restrictor to act on a servo control valve. These disclosures are found in German Pat. Nos. DE-OS 15 55 480, DE-OS 28 23 559 and application Nos. P 30 07 781.7 and P 30 07 780.6.

The invention proposes to obtain a form and characteristics of a control pressure that are particularly well suited for coupling with a servo control valve.

The problem is solved by providing an additional restrictor in the control signal line and means whereby the pressure gradient in it is switched to the servo control valve. The line that leads to the relief valve jet, which is controlled hydraulically by the pressure in front of the restrictor, can be connected to the line beyond the restrictor, especially if this line leads to another consumer and thus assures a minimum pressure. However, this line can also be connected to another pressure-medium source. The restrictor can be adjustable and the adjusting element of the restrictor can be connected with the adjusting element of the primary energy source, especially if the primary energy source is a reciprocating engine.

Parallel to the restrictor, an additional relief valve jet, also controlled by the pressure in front of the restrictor or the pressure gradient at this restrictor, can be provided; it protects the pump feeding the restrictor when the latter is closed too much or completely, e.g., plugged.

According to another embodiment of the object of invention, an additional relief valve jet is provided; it is connected in parallel to the relief valve jet and the (second) restrictor which are connected one behind the other in the control signal line. The pump feeding the restrictor is protected by this relief valve jet. The second relief valve jet also assures that the pressure at the inlet of the first-mentioned relief valve jet, which is controlled by the pressure in front of the restrictor, is constant. This additional relief valve jet also restricts thus the maximum possible level of the signal pressure in front of the second restrictor. Because, especially if the line leading from the first-mentioned (adjustable) restrictor delivers hydraulic energy to additional consumers, a greater stream always flows in the line in which the first-mentioned (adjustable) restrictor is located than the additional consumers—which occasionally can receive no flow at all—receive, the excess flow runs off through this second-mentioned relief valve jet to a tank. It may be particularly expedient if the two additional relief valve jets are simultaneously present. When additional consumers are present, this additional relief valve jet simultaneously assures that the pressure medium flows to them with the prescribed pressure.

The fact that a pressure signal suitable for switching to a servo control valve of a pump adjusting device is obtained facilitates the use of such a signal, which is generated by overloading when the r.p.m. of the primary energy source drops, for superimposition with the control of a pump adjusting device, dependent on the pressure gradient at a metering restrictor in the delivery line of the pump. With such a system with a metering restrictor in the delivery line of the pump and a pump adjusting element, which always regulates the delivery flow of the pump so that a definite prescribed pressure gradient always develops in it, independently of the opening given the metering restrictor, it can be determined by adjusting the opening of the metering restrictor which delivery stream flows to the connected consumer and the velocity of movement of the consumer can thus be determined by adjusting the metering restrictor.

The combination of such a drive mechanism with a pump and with a metering restrictor located in its delivery stream and with an adjusting device for the pump, influenced by the pressure gradient at this metering restrictor, with a signal device, with which a pressure signal generated in the flow of an additional constant pump in front of a restrictor when the r.p.m. of the pump drive shaft drops acts on the pump adjusting mechanism is thus an essential inventive concept, that is, effecting the combination such that both the pressure gradient at the said metering restrictor and the pressure in front of the said restrictor in the feed line of the constant pump act on the same servo control valve at the adjusting device of the pump, in which case the pressure signal determined by the pressure in front of the restrictor in the delivery stream of the constant pump is superimposed on the signal generated by the pressure gradient at the metering restrictor such that when the r.p.m. of the pump drive shaft drops, the pump is adjusted to a smaller stroke volume per revolution. Provided it is assured that the signal dependent on the pressure in front of the restrictor in the delivery stream of an additional constant pump is suitable with regard to size and characteristics for switching to the servo control valve already present for the control device with the measuring restrictor, this use or combination is independent of the particular design of the device that emits the signal dependent on the pressure in front of the restrictor in the delivery stream of the constant pump, provided only this signal is tuned to the operating characteristics of the servo control valve with respect to its size and characteristics. In a drive system in which a metering throttle is located in the delivery stream of the adjustable main pump and the adjusting device for the pump is provided with a servo control valve that is acted on by its pressure gradient, the problem is to switch another signal that is dependent on the r.p.m. of the pump drive shaft and suitable in its size and characteristics to this servo control valve. From this standpoint the invention can be viewed as an improved design of a drive system with an adjustable pump and a metering restrictor in its delivery stream and with an adjusting element of the pump which is dependent on the pressure gradient at this metering restrictor, in which case the improved design consists in switching an additional pressure signal to the servo control valve of the pump adjusting device.

A particularly expedient improved design for where at least two pumps are used, each of which delivers to at least one of the consumers assigned it, it is characterized that the pressure gradient at the restrictor in the control signal line acts on the servo control valves assigned to one pump, inasmuch as several independent adjustable pumps are provided, where each pump is assigned to a delivery line with a metering restrictor and each pump is provided with an adjusting element that is influenced by the pressure gradient at the assigned metering restrictor. Through the parallel switching of the drive shaft r.p.m.-dependant signal in front of the restrictor in the delivery stream of the constant pump to the servo control valve of both pumps, a favorable characteristic is achieved, especially insofar as under the effect of the r.p.m.-dependent signal determined by the pressure in front of the restrictor in the delivery stream of the constant pump both pumps are set, proportionally to each other, to a smaller stroke volume, such that the ratio of the delivery streams remains the same.

A control according to the invention is particularly suited for hydrostatic drive systems of construction machines, preferably dredgers or backhoes.

The dredgers or backhoes known to date are equipped with double-pump units, where the stroke volume adjustment of both pumps is coupled together and where a total-power regulator is provided that is acted on by the pressure in the delivery lines of the two pumps and adjusts the two pumps so that the sum of the powers absorbed by the two pumps remains constant. Because the adjustments of the two pumps are coupled together, the delivery streams of both pumps also always remain identical to each other. This has two significant disadvantages:

1. By coupling the adjustment of the two pumps, different reactions on the consumer speeds preset at the restrictors result with the engagement of the total-power regulator. This is particularly disturbing during the simultaneous actuation of several consumers. For example, if the lifting cylinder is acted on in a dredger or backhoe and the hydraulic motor of the rotating mechanism is also switched on, the hydraulic motor will receive a high torque during the acceleration in the rotational motion and thus generate a high pressure, such that the total-power regulator engages and reduces the stroke volume of both pumps by the same amount. The direction of movement resulting from lifting and swivelling is, however, thus changed, depending on the speed prescribed, with the result that the attendant at the operating control block must intervene correctively in throttling the streams in order to preserve the originally intended, resulting direction of movement. If the acceleration of the rotating mechanism ends, the pressure drops, with the result that the total-power regulator no longer engages and both pumps are again set in the same degree to a greater stroke volume per revolution. The ratio of the two consumer speeds is in turn modified thereby, so that the resultant direction of movement is again changed. In the familiar control setup this means that a disturbance always develops with reference to the direction of movement intended if two or more movements are simultaneously carried out and the total-power regulator engages.

2. If additional pumps, whether constant pumps or adjustable ones, are driven by the primary energy source, besides the double-pump unit equipped with the total-power regulator, their power consumption is not taken into account by the total-power regulator of the double-pump unit. Besides pumps, other energy consumers such as generators or compressors, can also be connected. Since their power consumption is not taken into account by the total-power regulator and because of an overloading of the primary energy source must be prevented if the double-pump unit absorbs the maximum possible power and the additional pump or pumps or other units simultaneously absorb large power inputs, the only possibility is to adjust the total-power regulator to a value that is smaller than the maximum power output of the primary energy source by the maximum possible energy consumption of the other pumps or energy consumers. In all operating states in which the other pumps or secondary drives receive only a little power, the full power of the primary energy source cannot be utilized with the double-pump unit; therefore, a large primary energy source must be installed, which is then operated predominantly in an unfavorable partial-load range.

These disadvantages are avoided by the arrangement according to the invention. A resultant superimposed movement with the simultaneous loading of two energy consumers, e.g., working cylinders, each loaded by one pump, does not change its direction if the r.p.m.-dependent signal engages because with its engagement both pumps are swung back, independently of each other, only so far that the pressure gradient at the two metering throttles becomes identical. If the metering throttles in the delivery stream of the two pumps are opened, both pumps are adjusted by the controls of both pumps so that the predetermined pressure gradient sets in at each of the two metering throttles. This is determined by the delivery pressure in front of the metering restrictor, the control pressure beyond the metering restrictor, and the pretensioning of the spring at the servo control valve of the pump adjusting device. The delivery streams and thus the consumer speeds are then in the same ratio as the openings of the metering throttles. Now if their r.p.m. drops as a result of overloading of the primary energy source, the delivery stream of the constant pump and thus the pressure in front of the restrictor in the delivery line will be reduced and thus a pressure signal is switched to both servo control valves, with the result that both pumps swing in the direction to a smaller stroke volume per revolution, but only so far that the r.p.m.-dependent pressure signal and the reduction in the pressure gradient at the metering throttle are in the same ratio. If there should be a tendency in one of the pumps to speed up, it immediately receives a countersignal such that the pressure gradients at the two metering throttles are again compensated. However, if the pressure gradients at the two metering throttles are maintained the same, the absolute stream flowing through the two metering throttles does vary, but not the ratio of the flows to each other.

In addition, in order to assure that inadmissibly high pressures do not develop in a system in which an arbitrarily adjustable restrictor is located in the delivery line between the pump and the consumer and when the adjusting element of the servo control valve of the pump adjustment device is acted upon, on the one hand, by the pressure in front of the metering restrictor and, on the other hand, by the pressure beyond this said metering restrictor and spring and in that the pressure gradient at the restrictor in the control signal line and the pressure gradient at the metering restrictor act on separate control pressure spaces of the same servo control valve and at the same time to prevent an unnecessary energy loss through the opening of one of the relief valve jets connected to the delivery line that is under full consumer pressure, a control in which a relief valve jet is connected to the delivery line and characterized in that a relief valve jet adjusted to a lower pressure than the relief valve jet connected to the delivery line is connected to the control pressure line between the additional restrictor and the servo control valve which leads to one pressure space of the servo control valve and branches off beyond the metering restrictor. The effect is that the control pressure drops due to the opening of the additional relief valve jet and thus the pump is adjusted through the servo control valve to a smaller stroke volume per revolution before the relief valve jet connected to the delivery line opens. Because with the usual characteristics in a smaller delivery stream the resistance at the consumer and thus the pressure also decrease, the pressure is reduced by such a back-swinging before the relief valve jet, through which it is released under full pressure, opens.

An implementation example of the object of this invention is shown in the drawing as a circuit diagram with two modifications for an individual component.

Figure 7:
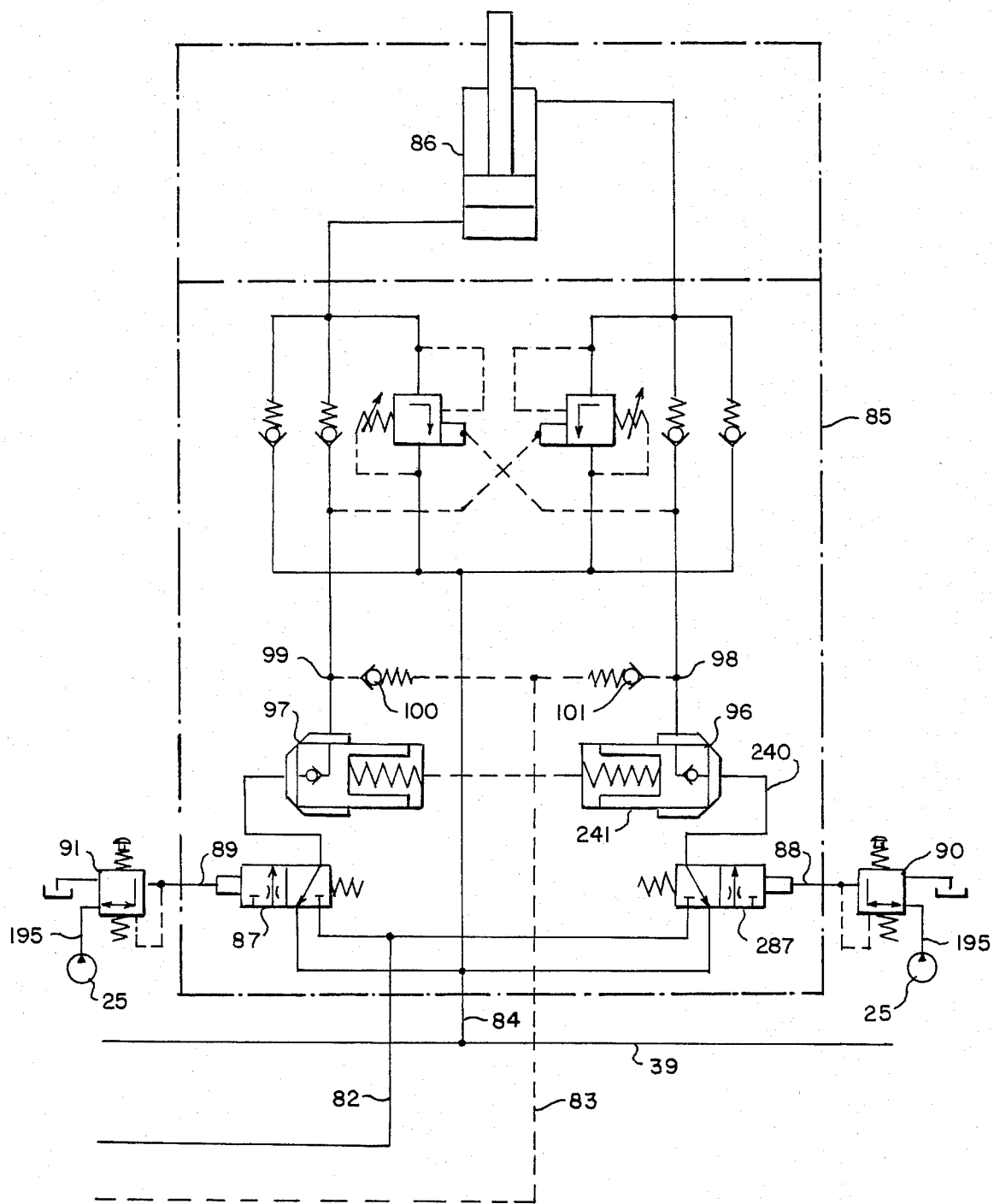
Figure 8:
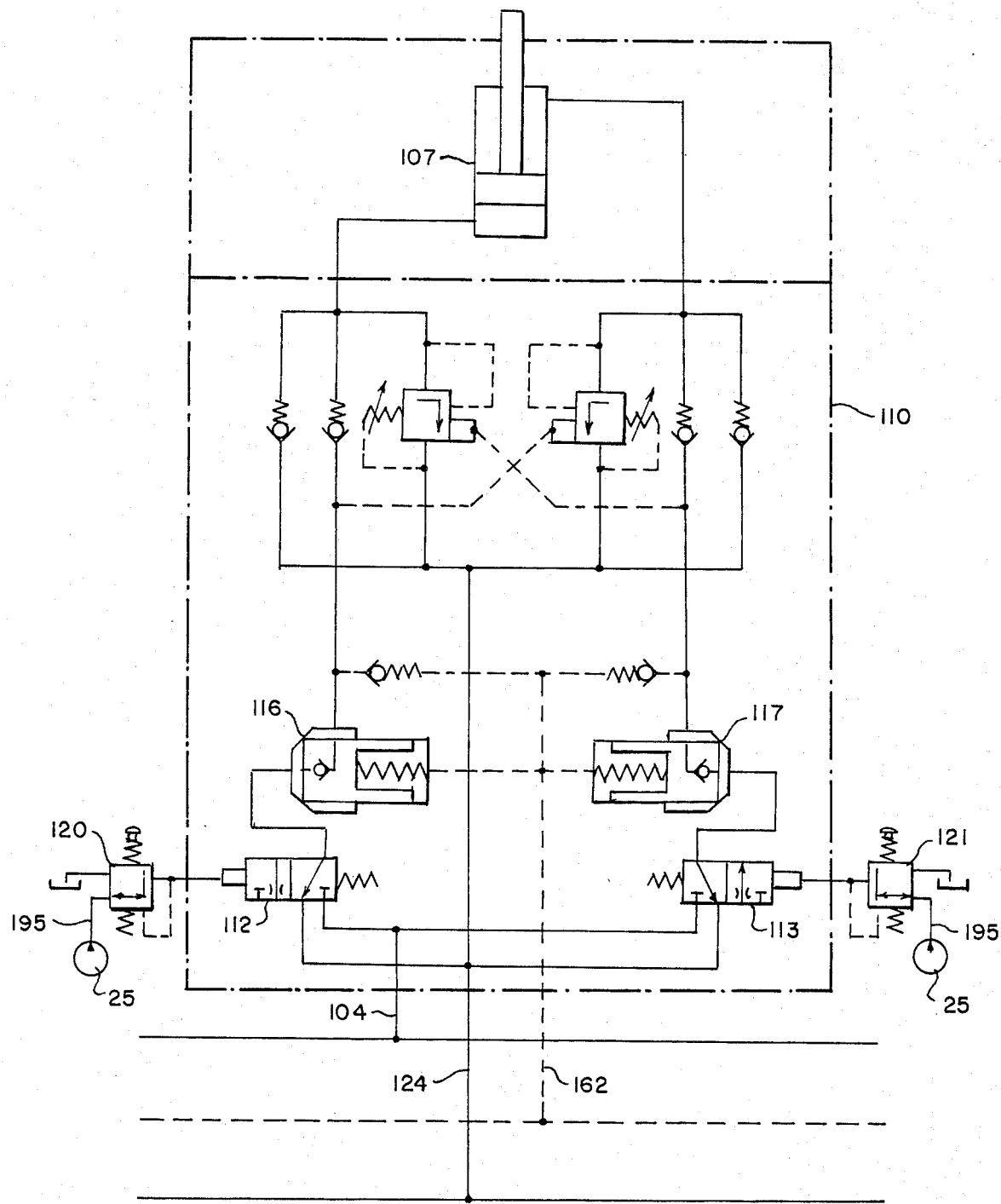
Figure 9:
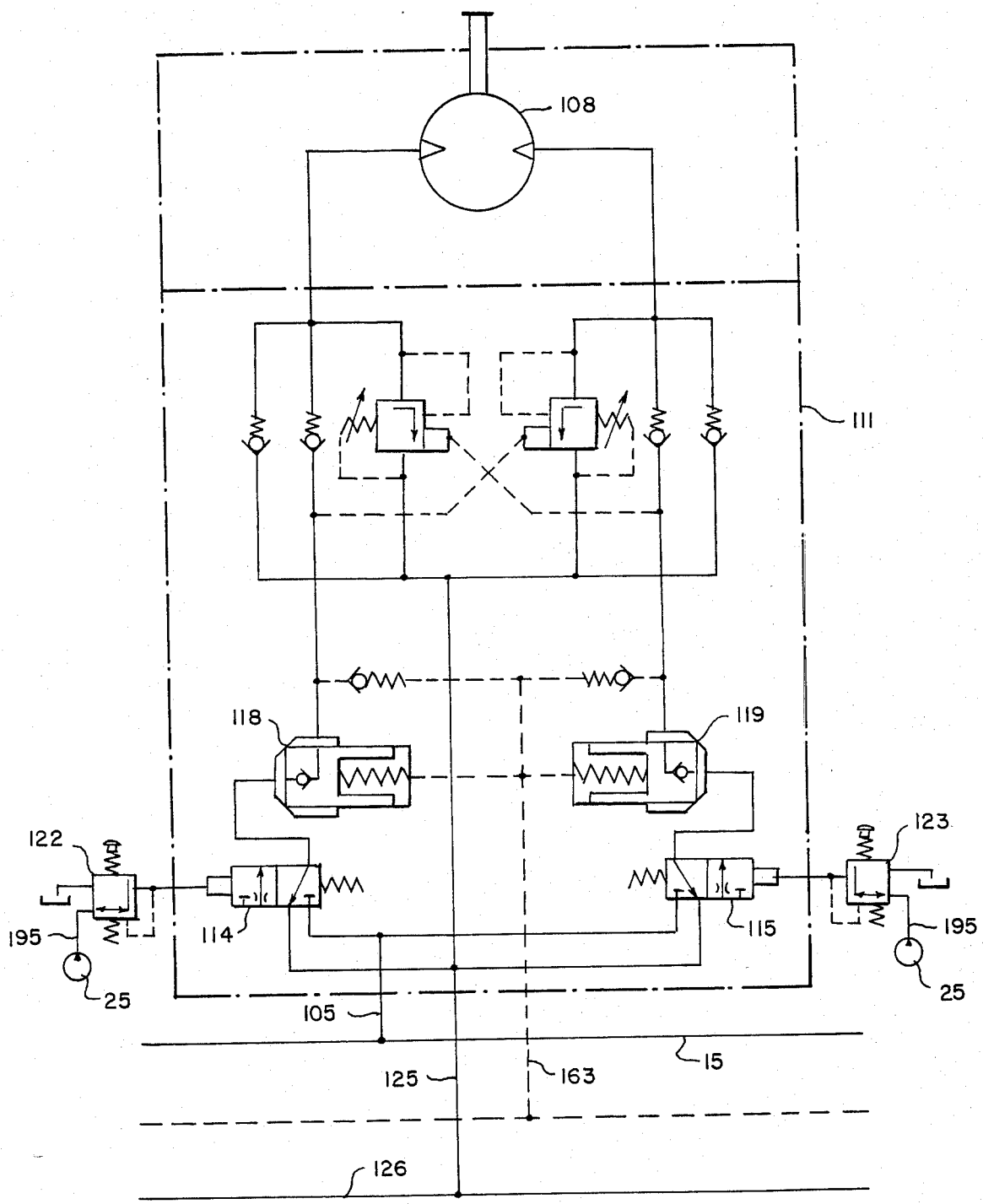
Figure 10:
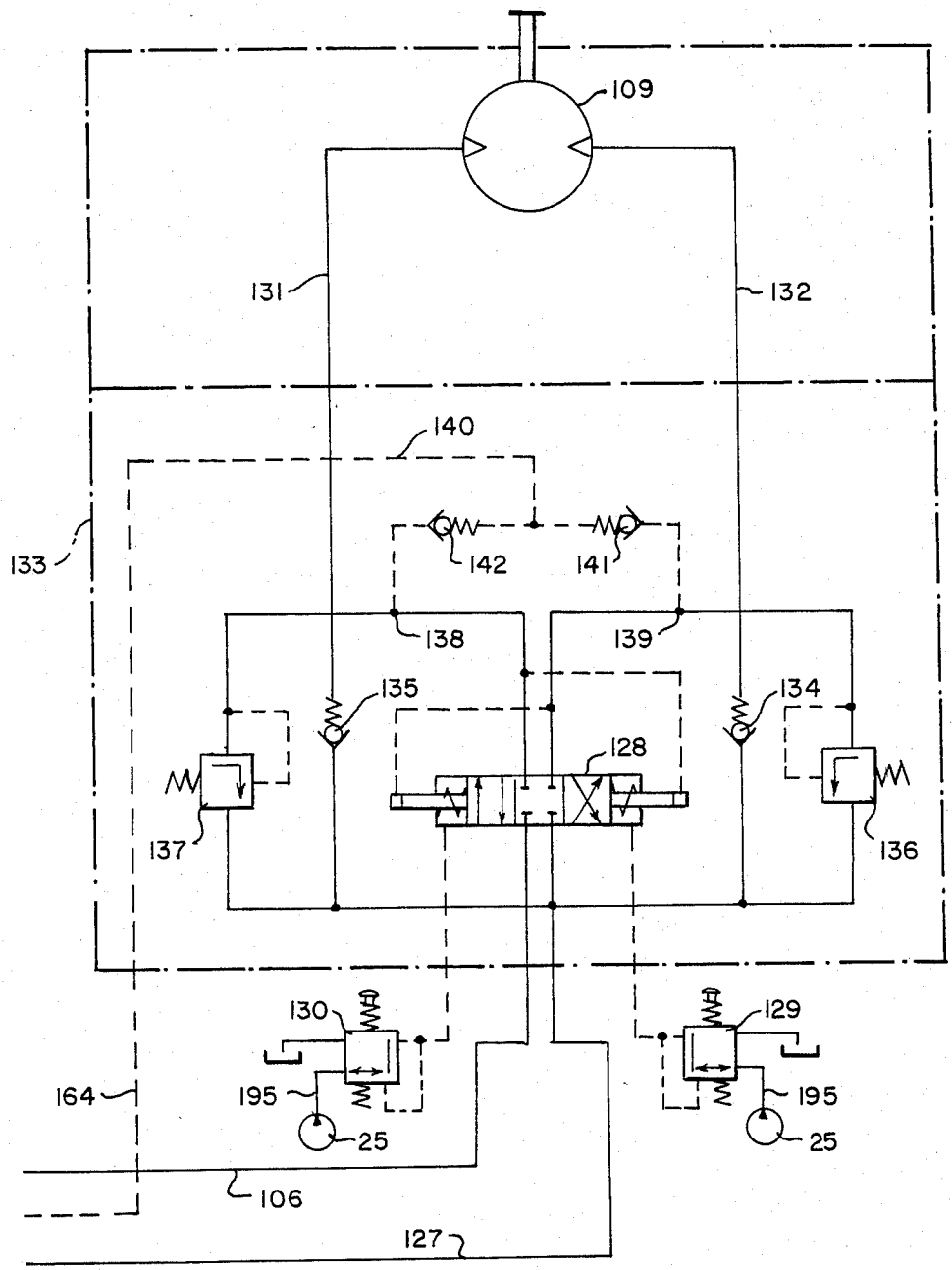
Figure 11:
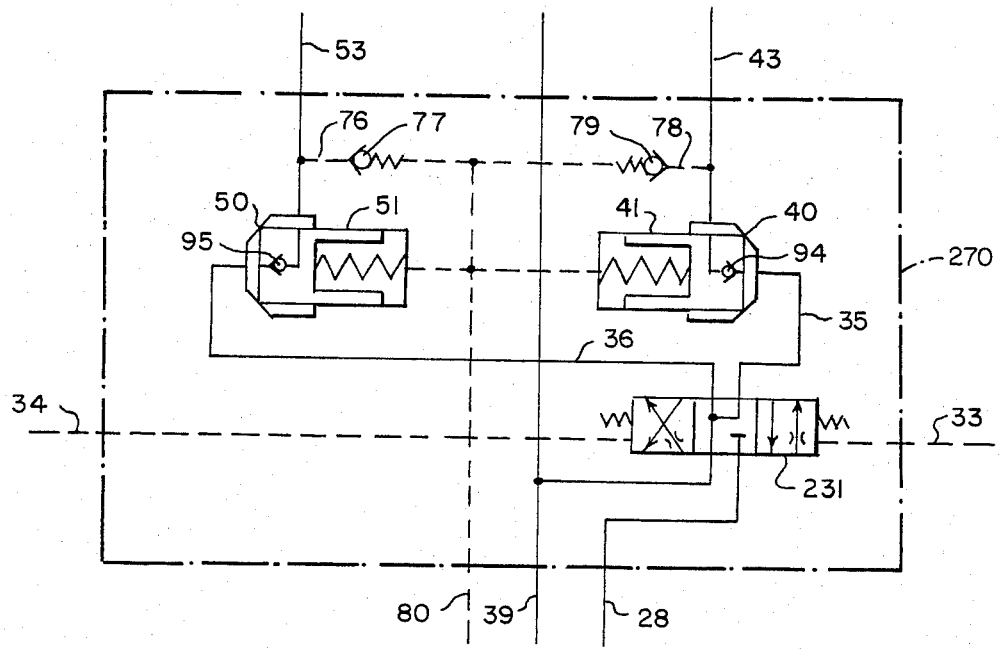

FIGS. 7, 8 and 9 respectively show an overall control unit 85 or 110 or 111 with assigned consumer;

FIG. 10 shows the circuit diagram for a constant pressure regulation;

FIG. 11 shows another design for a partial control unit; and

Figure 12:
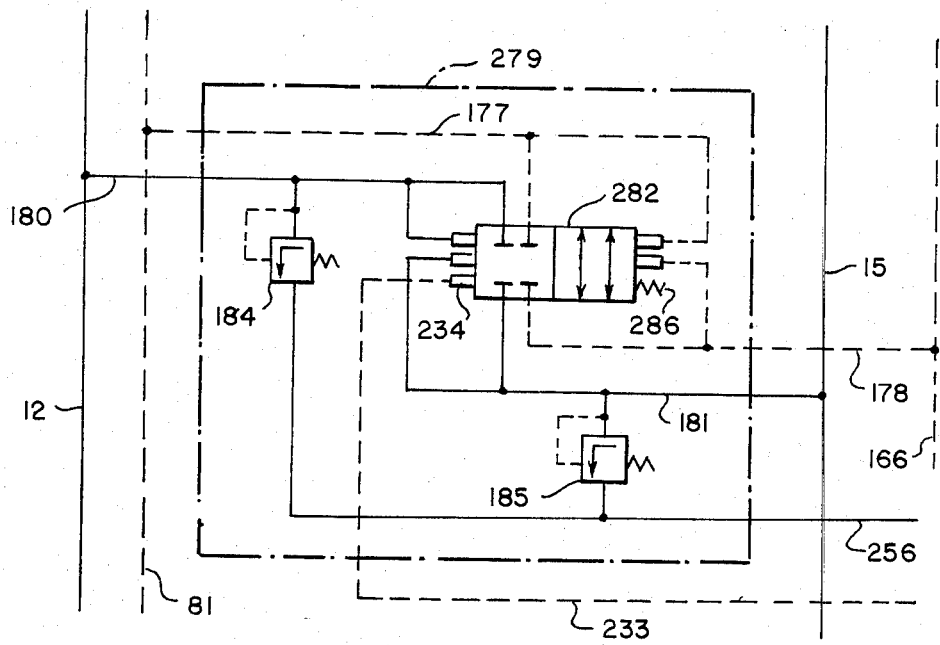

FIG. 12 shows a further developed design for a coupling unit.

The pumps 3 and 4 are driven by the internal-combustion engine 1 by means of the shaft 2. The regulating unit 5 of the pump 3 is connected with a pump adjusting piston 6, which is capable of sliding in a pump adjusting cylinder 7 and divides it into two pressure chambers 8 and 9. The pump 3 discharges into a delivery line 12, from which the pressure chamber 9, in which a spring 11 is located, is acted upon through the branch lines 13 and 14. The loading of the pressure chamber 8 is regulated through a hydraulically controlled servo control valve 10

The pump 4 feeds into a delivery line 15. The regulating unit 16 of pump 4 is connected with a pump adjusting piston 17, which is capable of sliding in a pump adjusting cylinder 18 and divides it into two pressure chambers 19 and 20, in which case a spring 21 is located in the pressure chamber 20. This pressure chamber 20 is connected to the delivery line 15 through a branch line 321 and another branch line 22. The loading of the pressure chamber 19 is regulated through a hydraulically controlled servo control valve 23. Both pumps 3 and 4 are located in a common housing 24.

Two other pumps 25 and 26, designed as constant pumps are driven by the shaft 2 (pump 26 can, however, also be driven by a secondary power take-off of the engine 1 in another embodiment).

A branch delivery line 28 branches off from the delivery line 12; it leads to a partial control unit 27, in which the branch delivery line 28 is divided into two partial lines 29 and 30. Each of the two partial lines 29 and 30 leads to a single-edge servo valve spool 31 or 32, where the single-edge servo valve spool 31 is controlled hydraulically and is loaded with pressure through a pressure pick-off control line 33 by an arbitrarily actuatable control pressure pick-off 92 located in the operator's cab of the dredger. In just such a manner the hydraulically controlled single-edge servo valve spool 32 is loaded with control pressure through a pressure pick-off control line 34, in which case the pressure pick-off control line 34 leads to another, arbitrarily actuatable control pressure pick-off 93, also located in the operator's cab. The single-edge servo valve spools 31 and 32 function as metering restrictors through which a throttled stream is conveyed from the partial line 29 to the line 35 or from the partial line 30 to the line 36. In the other position the single-edge servo valve spool 31 connects the line 35 with the return line 37 and in a similar manner the single-edge servo valve spool 32 in the other position connects the lines 36 and 38, where the two return lines 37 and 38 lead jointly to the branch return line 39.

The line 35 leads to a parallel-connected restrictor 40 with a slide valve 41, the back side of which is acted upon by a spring 42 and by the control pressure present in a control pressure line 53. A line 43 proceeds from the parallel-connected restrictor 40; it is divided into two lines 44 and 45, which lead to a pressure chamber 46 or 47 of the two parallel-connected working cylinders 48 and 49, provided for "lifting" in the dredger.

Analogously, the line 36 leads to a parallel-connected restrictor 50 with a slide valve 51, the back side of which is acted upon by a spring 52 and by the pressure in a control line 53. A line 53 proceeds from the parallel-connected restrictor 50; it is divided into two lines 54 and 55, the line 54 of which leads to the pressure chamber 56 of the working cylinder 48 and line 55 to the pressure chamber 57 of the working cylinder 49.

A check valve 58 opening toward the working cylinder 48 is located in line 54. Between this check valve 58 and the working cylinder 48 a line 59 is connected to the line 54. This line 59 leads to a controlled relief-valve jet 60, whose discharge through line 61 and line 62 leads to the partial return line 39. A line 63 is also connected to line 54 between the check valve 58 and the working cylinder 48. This line 63 contains a resuction check valve 64, which in turn is connected to the line 62.

Analogously, a check valve 68 is located in the line 44 and a line 65, in which a resuction check valve 66 is located, is connected between check valve 68 and the working cylinder 48. The resuction check valve 66 is also connected to the line 62. A line 69 is also connected to the line 44 between the check valve 68 and the working cylinder 48; this line 69 leads to a hydraulically controlled relief valve jet 70, whose drain line 71 is connected to the line 62. The control pressure chamber of the relief valve jet 70 is connected through line 72 to line 54 in front of the check valve 58, and the control pressure chamber of the relief valve jet 60 is similarly connected through line 73 to line 44 in front of the check valve 68. If line 54 carries pressure, the control pressure chamber of the relief valve jet 70 is loaded by this pressure and thus the relief valve jet is relieved of spring pressure, such that it opens with a more or less slight pressure in line 44, and the same is inversely true for the relief valve jet 60 if the line 44 carries pressure in front of the check valve 68.

These valves 58, 64, 60, 70, 68, and 66 are combined in a control unit 74, which is attached directly to the working cylinder 48.

An analogously identical valve arrangement is provided in the control unit 75, which is attached to the working cylinder 49.

Inside of the partial control unit 27 a line 76, which leads to a check valve 77, is connected to the line 53. A line 78, which leads to a check valve 79, is also connected to the line 43. The two check valves 77 and 79 are in turn connected to the partial control pressure line 80, to which the pressure chambers behind the slide valves 41 and 51 are also connected.

A relief check valve 94 opening toward the line 35 is located on the slide valve 41. Similarly, a relief check valve 95 opening toward the line 36 is located in the slide valve 51. The control pressure line 80 leads to an overall control pressure line 81, to which a branch control pressure line 83 is connected. A branch line 82 is connected to the delivery line 12. The two branch lines 82 and 83 lead to an overall control unit 85, from which a return line 84, which is connected to the return line 39, departs. The overall control unit 85 is attached to the working cylinder 86, which serves to actuate the scoop of the dredger. The general arrangement of the hookup of the overall control unit 85 is analogous to the sum of the partial control unit 27 and the control unit 74. Two single-edge servo valve spools, 287 and 87 are provided, of which the single-edge servo valve spool 287 is acted upon through a pressure pick-off control pressure line 88 by an arbitrarily actuatable control pressure pick-off 90, which is located in the vicinity of the control pressure pick-offs 92 and 93, which act on the pressure pick-off control pressure lines 33 and 34. The single-edge servo valve spool 87 is correspondingly controlled by means of a pressure pick-off control pressure line 89, which in turn also leads to an arbitrarily actuatable control pressure pick-off 91, located in the vicinity of the control pressure pick-offs 90, 92 and 93.

A parallel-connected restrictor 96 or 97 is connected beyond the two single-edge servo valve spools 86 and 87 that act as metering restrictors. Beyond this restrictor 96 or 97 a branch line leading to the partial control pressure line 83 and having a check valve 100 or 101 branches off at the connection point 98 or 99.

The return line 39 leads to a main return pump 102, which leads directly into the housing 24 of the pumps and to which a pretensioned storage container 103 is connected.

The branch lines 104, 105 and 106 branch off from the delivery line 15 emerging from the pump 4; of these the branch delivery line 104 leads to a working cylinder 107 for bending the shovel shaft, branch delivery line 105 leads to a hydraulic motor 108 for traveling, and branch delivery line 106 leads to a hydraulic motor 109 for swivelling the dredger. The overall control units 110 and 111 are designed similarly as the overall control unit 85. This means that they each contain two single-edge valves 112 or 113 or 114 or 115 and a parallel-connected restrictor 116, 117, 118 or 119 is subsequently connected, in which case the single-edge servo valve spool 112 is acted on from an arbitrarily actuatable control pressure pick-off 120, single-edge servo valve spool 113 is acted on from a control pressure pick-off 121, and single-edge servo valve spool 114 is acted on from a control pressure pick-off 122, and accordingly the single-edge servo valve spool 115 is acted on from a control pressure pick-off 123. The partial return lines 124 and 125 emerging from the overall control devices 110 and 111 all lead to a branch return line 126, which is connected to the main return line 102. The same is true for the return line 127. The lines 106 and 127 are connected to a 4-connection/3-position multi-way acting valve 128, which is hydraulically controlled by the two control pressure pick-offs 129 and 130 and selectively connects either the one connection 131 of the hydraulic motor 109 with the delivery line 106 and the other connection 132 of the hydraulic motor 109 with the return line 127, or inversely the delivery line 106 with the connection 132 and the return line 127 with the connection 131. An additional control unit 133 is also provided here, which is attached directly to the hydraulic motor 109 and in which two return valves 134 and 135 and two relief valve jets 136 and 137 and connections 138 and 139 for a control pressure line 140 are provided, in which case return valves 141 or 142 are located between the control pressure line 140 and connections 139 and 138.

The overall control pressure line 81 assigned to pump 3 continues into the control pressure line 150, which leads to a branch line 152, in which a restrictor 153 is located and which leads to a pressure chamber of the hydraulically controlled servo control valve 10. The opposite pressure chamber is connected through branch line 154 to line 14, which is acted on with the delivery pressure in the delivery line 12 of pump 3.

A flow regulator 155 is connected to the line 150 also; its exit leads into the internal chamber of the housing 24 of pumps 3 and 4.

A relief valve jet 157 is connected to line 152 between the restrictor 153 and the control pressure chamber of the servo control valve 10.

A line 158 emerges from line 13; it leads to a connection 159 of the servo control valve 10 so that pressure medium delivered through this line 158 and the connection 159 of the pump 3 can be conveyed over delivery line 12, lines 13 and 158, and the connection 159 through the servo control valve 10 into the pressure chamber 8.

Between the line 158 and line 150 there is a connecting line 160 in which a circulation restrictor 161 is located (this line 160 with the restrictor 161 can be omitted if the servo control valve 10 is designed with a sufficiently large negative overlap so that the servo control valve 10 in the neutral position a partial stream always flows through the lines 12, 13, 158 and the connection 159 to the pressureless tank 156 or preferably into the inner chamber of the housing 24 of pumps 3 and 4. This solution has the advantage that the flow regulator 155 does not additionally need to be set to the stream flowing through the circulation restrictor 161).

Partial control pressure lines 162, 163 and 164 proceed from the control units 110 and 111 and from the control device 133; they are connected to an overall control pressure line 165 that continues in the line 166, to which the line 167 with the restrictor 168 is connected and to which the flow regulator 169 is connected. The line 170 proceeding from the restrictor 168 leads to a pressure chamber of the hydraulically controlled servo control valve 23, in which case the opposite pressure chamber is connected to the line 22 through the connection 171. A relief valve jet 172 is connected to the line 170.

The connection 173 of the servo control valve 23 is connected to line 321 through the line 174. A connecting line 175 is located between the lines 174 and 166; it contains a circulation throttle 176 (the same is true here as stated with reference to line 160 and restrictor 161).

A coupling control line 177 is connected to the overall control pressure line 81 and a coupling control line 178 is connected to the overall control pressure line 165, in which case these two control lines lead to the coupling unit 179. A 4-connection/2-position valve 182 is located in the latter; it is hydraulically controlled and has two control pressure chambers on each side, where a control pressure chamber equal in size to each control pressure chamber on the one side is assigned to the other side, in which case, however, it is not necessary that the two control pressure chambers on one side have the same diameter. A branch line 180 leads from the delivery line 12 into the coupling unit 179 and a branch line 181 also leads from the delivery line into the coupling unit 179. Here the two lines 180 and 181 are connected to the 4-connection/2-position valve 182 such that in the setting indicated the lines 180 and 181 are connected together and in the other setting these lines are shut off. The control pressure lines 177 and 178 are connected to the two other connections of the 4-connection/2-way valve 182 such that the lines 177 and 178 are connected together in the position of the valve slide indicated.

Two relief valve jets 184 and 185 are also located in the coupling unit 179, of which the relief valve jet 184 serves to protect the delivery line 12 and is connected to it through the line 180, while the relief valve jet 185 serves to protect the delivery line 15 and is connected to it through the line 181.

The line 180 loaded by the delivery pressure of pump 3 and the line 177 loaded with the control pressure assigned to pump 3 are connected to opposite sides to pressure chambers of equal size and the line 181 loaded with the delivery pressure of pump 4 and the line 178 loaded with the control pressure assigned to pump 4 are connected to pressure chambers of equal size and located on opposite sides of the 4/2-way valve 182, such that the two lines 177 and 178 loaded with control pressure are connected on the side on which the pressure spring 186 is located.

The constant pump 25 draws through line 187 from the housing 24 of pumps 3 and 4 and delivers into a line 188, which leads to an adjustable restrictor 189, the regulating unit 190 of which is in working connection with the regulating unit of the engine 1. A relief valve jet 193 is connected in front of restrictor 189 to the line 188 through a line 191 in which a filter 192 is installed; the drain of valve 193 is connected to a line 194, which in turn is connected to the line 195, which forms the continuation of line 188 beyond the restrictor 189 and which leads to additional consumers (not shown in the drawing).

A controlled relief valve jet 196 is also connected to the line 194; its control pressure is determined through line 197 by the pressure in front of the restrictor 189. The line 198 emerging from the relief valve jet 196 leads to a restrictor 199 and the line 200 emerging from the latter leads through a relief valve jet 201 to the tank 156. Parallel to the consecutively arranged relief valve jet 196 and restrictor 199, another relief valve jet 202 is installed, which maintains the pressure in front of the relief valve jet 196 constant. The essential fact is that the pressure gradient at the restrictor 189 controls the relief valve jet 196, which in turn controls the flow to the restrictor 199.

A maximum-pressure control line 203 branches off from the line 198 between the relief valve jet 196 and the restrictor 199 and a second maximum-pressure line 204 branches off from the line 200. Line 203 branches into two lines 205 and 206, which empty into a control pressure chamber of the servo control valve 10 or 23, on the same side on which the latter is acted upon by the delivery pressure of the assigned pump 3 or 4. Two lines 207 and 208 branch off from the line 204; they lead to the other side, which is acted on by a spring, of the hydraulically controlled servo control valve 10 or 23.

The mode of operation is as follows: When the engine 1 is running and is driving the pumps 3, 4, 25 and 26 and all the control pressure pick-offs 93, 92, 91, 90, 120, 121, 122, 123, 130 and 129 are unactuated, the pumps are in the zero-stroke position and do not deliver. No consumer is acted upon. Now if the control pressure pick-off 92 is actuated, the single-edge servo valve spool 31 will be actuated and it opens so that it effects a connection between the delivery line 12 and the line 44 to the working cylinder 48, in which case the parallel-connected restrictor 40 opens. At the same time, the check valve 79 opens, so that the line 80 and thus the line 81 are also loaded by pressure.

Because the single-edge servo valve spool 31 acts as a metering restrictor, the pressure in line 35 and thus the pressure in line 43 and thus also the pressure in line 78 and lines 80 and 81 are less than the pressure in the branch delivery line 28 and the delivery line 12. The pressure in the delivery line 12 acts through the lines 13, 14 and 154 on the one side of the servo control valve 10 and the pressure in the control pressure line 81 acts through lines 150, 151 and 152 on the other side of this servo control valve, on which the spring also acts. The spring is designed here so that the servo control valve 10 responds at a quite specific pressure difference between the pressures in the lines 154 and 152, e.g., to a pressure difference of 20 bar. As a result, the regulating unit 5 of pump 3 is adjusted by means of the servo control valve 10 through the pump adjusting piston 6 such that it delivers a stream that produces this predetermined pressure gradient at the single-edge servo valve spool 31 which acts as a metering restrictor. That is, if the setting of the single-edge servo valve spool 31 is modified by a change in the setting of the control pressure pick-off 92, the pump 3 will also be adjusted to a different delivery stream, i.e., to such a stream that the predetermined pressure gradient again develops at this single-edge servo valve spool 31 which acts as a restrictor.

The parallel-connected restrictors 40, 50, 96 or 97 and 16 or 117 have the following action: If two control pressure pick-offs, assigned to two different consumers, are actuated, e.g., the pick-off 92 and the pick-off 90, two single-edge slide valves, 31 and 86 in the said case, will simultaneously open and will thus simultaneously connect two consumers, here the two working cylinders 48 and 49 and also the working cylinder 86, with the same pump 3. The same pressure acts here in both working cylinders 48 and 49. However, it is unlikely that the same pressure acts incidentally also in the working cylinder 86. Rather, one of the consumers will be more highly loaded and thus require a higher pressure. Assuming that the pressure in the working cylinder 86 is higher than the pressure in the working cylinders 48 and 49, then there is a higher pressure at the branch point 98 than in the line 43, with the result that the check valve 79 will be closed and the control line system 80, 83 is acted upon by the pressure at the branch point 98 through the opening of the check valve 101. Because the back sides of the slide valves 41 and 241 are also loaded by this control line system, but different pressures prevail in front of this slide valve in the line 35 or 240, a different throttling effect is produced at the restrictors 40 and 96, that is, such a great pressure gradient is produced by this parallel-connected restrictor 40 at the consumer 48, 49, which produces the lesser pressure, that a higher pressure is produced in front of this parallel-connected restrictor 40 in line 35 and thus in line 28 and thus in line 12 and thus in line 82 than required by the consumer, in which case a correspondingly smaller throttling effect is produced at the parallel-connected restrictor 96 due to the pressure in line 240 under the effect of the control pressure in line 83, because at this pressure the consumer pressure, which acts on the slide valve 241, is sufficiently great to open the parallel-connected restrictor 96 completely so that no pressure gradient develops at it.

This arrangement of the parallel-connected restrictors, which are acted on jointly by the same control pressure on the back side, has the essential advantage that if two consumers could together absorb a greater stream than the pump 3 delivers, the stream furnished by pump 3 to the two consumers—in the present case to the consumers 48, 49 and to the consumer 86—is distributed in proportion to the opening width of the throttle gaps.

The check valves 58 and 68 act as a protection against pipe breakage. This means that if a leak develops in line 12 or line 28 or line 82 or any other line connected with them and the pressure escapes, the consumer, which is connected by actuation of the assigned control pressure pick-off and thus opening of the assigned single-edge slide valve, cannot sink back under load. If, for example, it is raised under load and thus the working cylinders are under pressure and line 12 ruptures, check valve 58 closes. The fluid present in the working cylinders 48 and 49 is thus enclosed and fixed, such that no undesired movement can occur since the relief valve jets 60 and 70 are also closed, since no pressure is present in lines 53 and 43 and thus the relief valve jets 60 and 70 are not controlled.

However, if the single-edge servo valve spool 31 is opened by actuating the control pressure pick-off 92, pressure develops in line 43, such that pressure medium flows through the lines 43, 44 into the working cylinders 48 and 49. The pressure present in line 43 is also present through line 73 in the control pressure chamber of the relief valve jet 60, such that the latter is opened. That is, the stream of pressure medium flowing from the pressure chambers 56 and 57 of the working cylinders 48 and 49 can flow off unhindered through line 54 into line 59, relief valve jet 60, lines 61 and 62, and into the partial return line 39 and thus into the return line 102. The speed of movement of the piston in the working cylinders 48 and 49 will be determined here by the degree to which the single-edge slide valve 31 is opened. If, as a result of external forces, the pistons in the working cylinders 48 and 49 attempt to speed up with reference to this stream, they draw more fluid, with the result that the pressure in line 44 and thus in line 43 drops. Thus, the pressure in the control pressure space of the relief valve jet 60 through line 73 drops so that the latter closes to the extent to which the pressure has dropped, i.e., a throttling effect is produced in the relief valve jet 60, which throttles the stream flowing out of the pressure chambers 56 and 57, such that the speed of movement of the pistons in working cylinders 48 and 49 is braked by this throttling effect. The relief valve jets 60 and 70 are, however, also controlled by the pressure in lines 59 and thus 54 and 69 and thus 44. The relief valve jets 60 and 70 thus act also as a protection against inadmissibly high pressure in the working cylinders 48 and 49. That is, if an excessively high pressure develops as a result of overloading or jerky loading, either relief valve jet 60 or 70 opens as a result of the excessive pressure, depending on the direction of the load, such that these relief valve jets 60 and 70 also act as overload-protection overpressure valves, even when neither of the control pressure pick-offs is actuated.

In particular, in such a case of the flowing off of pressure medium through one of the relief-valve jets 60 and 70, but also in any other case of excessive drawing of fluid into one of the pressure chambers 46, 47 or 56, 57, the assigned resuction check valve 64 or 66 opens so that the line 102 can be recharged from the tank 103 through the opened resuction check valve 64 or 66 and the line 62 and the partial return line 39.

If the control pressure pick-off 92 has been actuated and thus the single-edge slide valve 31 has been opened and the line 43 has thus been placed under pressure through the delivery line 12 and the lines 28, 29 and 35, and subsequently the actuation of the control pressure pick-off 92 is ended and the single-edge slide valve 31 is thus brought into the release position, the parallel-connected restrictor 50 is completely closed. This would have the result that the pressure acting on line 43 would be maintained and it thus maintains the relief valve jet 60 in the open position through line 73. However, if both control pressure pick-offs 92 and 93 are closed, both relief valve jets 60 and 70 would then also be closed. Therefore, a check valve 94, opening toward the pump 3, is provided in the slide valve 41; in the said operating state this check valve 94 causes the line 43 to be relieved through the check valve 94 when the parallel-connected restrictor 40 is closed.

The valves on the other side of the control unit 74 or the corresponding valves in the control unit 85 or 100 or 111 function in an analogous manner.

If such a pressure is generated by action on the control pressure pick-off 92 in the pressure pick-off control pressure line 33 that the single-edge servo valve spool 31 opens quite wide, such an intense flow is required thus in lines 29, 35 and thus also 28 and the delivery line 12 that the pump 3 alone can no longer deliver it. In this state the coupling unit 179 goes into action. As already stated, the spring acting on the servo control valve 10 for controlling the pump 3 with the latter valve 10 is designed so that a definite pressure gradient develops at the single-edge servo valve spool 31 acting as a metering restrictor, e.g., a pressure gradient of 20 bar. The spring 186 at the 4-connection/2-position valve 182 is designed so that this valve responds at a lower pressure gradient, ca. 15, between the delivery line 12 and the control pressure line 81. The 4-connection/2-position valve 182 is designed here so that when the slide valve begins to move, the control lines 177 and 178 are first connected with each other, with the result that the pump 4 is swung out sufficiently far that the same pressure is present in the delivery line 15 as in delivery line 12, in which case this pressure is generated in front of the restrictor 176 if no consumer is connected to the pump 4. With a further displacement of the slide valve in the 4-connection/2-position valve 182, the lines 180 and 181 will then also be connected together through the valve 182, so that the delivery stream of pump 4 is additionally delivered through the 4-connection/2-position valve 182 into the delivery line 12 of pump 3, in which case pump 4 is now swung out sufficiently far that it produces the delivery stream that is precisely required in order to produce, together with the delivery stream of pump 3, the pressure gradient required at the single-edge servo valve spool 31 acting as a metering restrictor 15 bar in the present case.

Although the consumers are protected directly by the relief valve jets 60, 70 and the corresponding relief valve jets at the other consumers, it is also necessary to protect the pump 3 and the overall arrangement by means of a relief-valve jet that prevents a part of the installation from being damaged by inadmissibly high pressure. For practical reasons, this relief valve jet is incorporated in the coupling unit 179; the relief valve jet 184 is connected through line 180 to the delivery line 12 and in a corresponding manner the relief valve jet 185 for protecting pump 4 is connected to its delivery line 15 through line 181. The opening of one of these relief valve jets has the disadvantage that pressure medium is released through it at the maximum pressure possible; this means that much energy is wasted in this relief valve jet. This is unavoidable for disintegrating brief pressure surges. However, it is advantageous if the opening of this relief valve jet for a prolonged period can be avoided. For this purpose, the relief valve jet 157 is assigned to pump 3; it is set at such a low pressure that it opens if a pressure prevails in the control line 81 that is below the response pressure of the relief valve jet 184, corresponding to the prescribed pressure gradient at the metering restrictor furnished by the single-edge slide valve 31 or 32 or 86 or 87, such that the relief valve jet 157 opens prior to the opening of the relief valve jet 184 and thus limits the maximum possible pressure in the line 152, with the result that with a slight rise in the pressure in line 154 the servo control valve 10 increases the pressure in the pressure chamber 8 of the pump adjusting cylinder 7 and thus adjusts the pump 3 to a smaller stroke and thus a smaller delivery stream, in which case it can be expected that after the end of this regulating process, effected by the increase in control pressure, the pressure in the delivery line 12 is reduced as a result of the diminished delivery stream and thus the response of the relief valve jet 184 can be prevented.

Analogously, a corresponding relief valve jet 172 is assigned to pump 4, which responds to the pressure in the control pressure line 166 and opens before the relief valve jet 185 opens.

In any case, only a protection against pressure peaks during the regulating process of the pump is achieved with this relief valve jet. There is no protection against overloading of the engine 1. This is achieved by the maximum-load control 230. The constant pump 25 delivers through line 188 to the operating connection with the regulating unit of the engine 1. The line 195 beyond the restrictor leads to the control pressure pick-offs 90, 91, 92, 93, 120, 121, 122, 123, 129 and 130. The externally controlled relief valve jet 196 is connected to this line 195; it is influenced through line 197 by the pressure in line 188 in front of restrictor 189. The relief valve jet 196 is adjusted to the pressure gradient that would prevail at the restrictor in the case of the operating r.p.m. provided. If this pressure gradient is present, the relief valve jet 196 is closed. If the pressure gradient is smaller than provided, the relief valve jet 196 opens and delivers a stream to the subsequent restrictor 199, at which a pressure gradient now also develops and this pressure gradient is switched over lines 203 and 204 as a pressure difference to the two sides of the two servo control valves 10 and 23. The result of this is that if the two pumps 3 and 4 deliver to at least one consumer and the maximum-load control 230 intervenes, the two pumps 3 and 4 are retracted proportionally, i.e., percentually in an identical degree, so that the direction of movement resulting from the movement superposition is not modified in the case of a superimposed movement of the two driven working cylinders. The rates of movement of two switched-in consumers are in an identical ratio to each other as the openings of the single-edge servo valve spools which act as metering throttles. Now if the r.p.m. of the engine 1 is reduced due to its overloading, the pressure gradient at the restrictor 189 will decrease and thus the relief valve jet 196 will open and a pressure gradient will thus develop at the restrictor 199 that acts on both servo control valves 10 and 23 in an identical manner. The setting of the two pumps 3 and 4 is thus shifted in the direction of a smaller stroke volume per revolution, but only to the extent that the pressure gradient at the restrictor 199 and the pressure drop at the single-edge slide valve acting as a metering throttle of the consumer switched in maintain an equilibrium. If there is a tendency at one of the pumps 3 or 4 to speed up, it immediately receives a countersignal that again equilibrates the two pressure drops. In this manner, the pressure gradients at the single-edge slide valves acting as metering throttles of the two consumers are maintained identical, with the result that the single-edge servo valve spools acting as metering throttles at them do modify the absolute quantity, but not the ratio of the quantities to each other and thus the ratio of the speeds of movement to each other.

The relief valve jet 202 serves to protect the constant pump 25. The by-pass relief valve jet 193 also protects the constant pump 25 against the case where the restrictor 189 is excessively or completely closed. In this case the oil flows through line 188, line 191, and the relief valve jet 193 into line 194.

The pump 26 is used for charging the pressure reservoir it delivers to the steering mechanism of the dredger (not shown in the drawing). The return from the steering mechanism still has sufficient pressure to charge the reservoir 103. The line 239 coming from the steering mechanism is connected to line for this purpose.

The pump 25 draws from the housing 24 in which the two pumps 3 and 4 are located in order to effect an exchange of pressure medium in the housing 24. The pressure medium flowing back from the steering mechanism through the line 239 flows, to the extent that it is excessive, through the relief valve jet 201 into the pressureless tank 156.

The volume of reservoir 103 is dimensioned so that the leakage loses and volume differences on the two sides of the piston can be compensated even with the actuation of several consumers in the same direction.

A modified embodiment of a partial control unit is shown in FIG. 11. The partial control unit 270 corresponds to the partial control unit 27 with the single difference that a single 4-connection/3-position valve 231 is provided instead of the two single-edge servo valve spools 31 and 32 that form the two metering restrictors in the partial control unit 27; this valve 231 can be regulated by means of the two control pressure pickoffs 92 and 93 through the control pressure lines 33 or 34 and in the neutral position shown in the drawing shuts off the branch delivery line 28 and connects the lines 35 and 36 to each other and connects the branch delivery line 28 with line 35 in a controlled position and at the same time connects the line 36 with the return line 39 and in the other controlled position connects the branch delivery line 28 with the line 36 and at the same time connects the line 35 with the return line 39.

The supplementary control unit 133 has a somewhat different construction and a different mode of operation than the control units 85 or 110 or 111. The 4-connection/3-position valve 128 is not only controlled by the two control pressure pick-offs 129 and 130, but it is also loaded on the side opposite the controlled side by the delivery pressure in the line 131 or 132 leading to the consumer, such that a state of equlibrium sets in at the valve slide of valve 128 when the valve 128 is controlled through one of the control pressure pick-offs 129 or 130. If the pressure drops at the consumer, the valve is again opened, such that a greater stream flows to the consumer and thus the pressure at the consumer is increased on the basis of the consumer characteristics.

A modified embodiment of the coupling unit is shown in FIG. 12.

Figure 1:
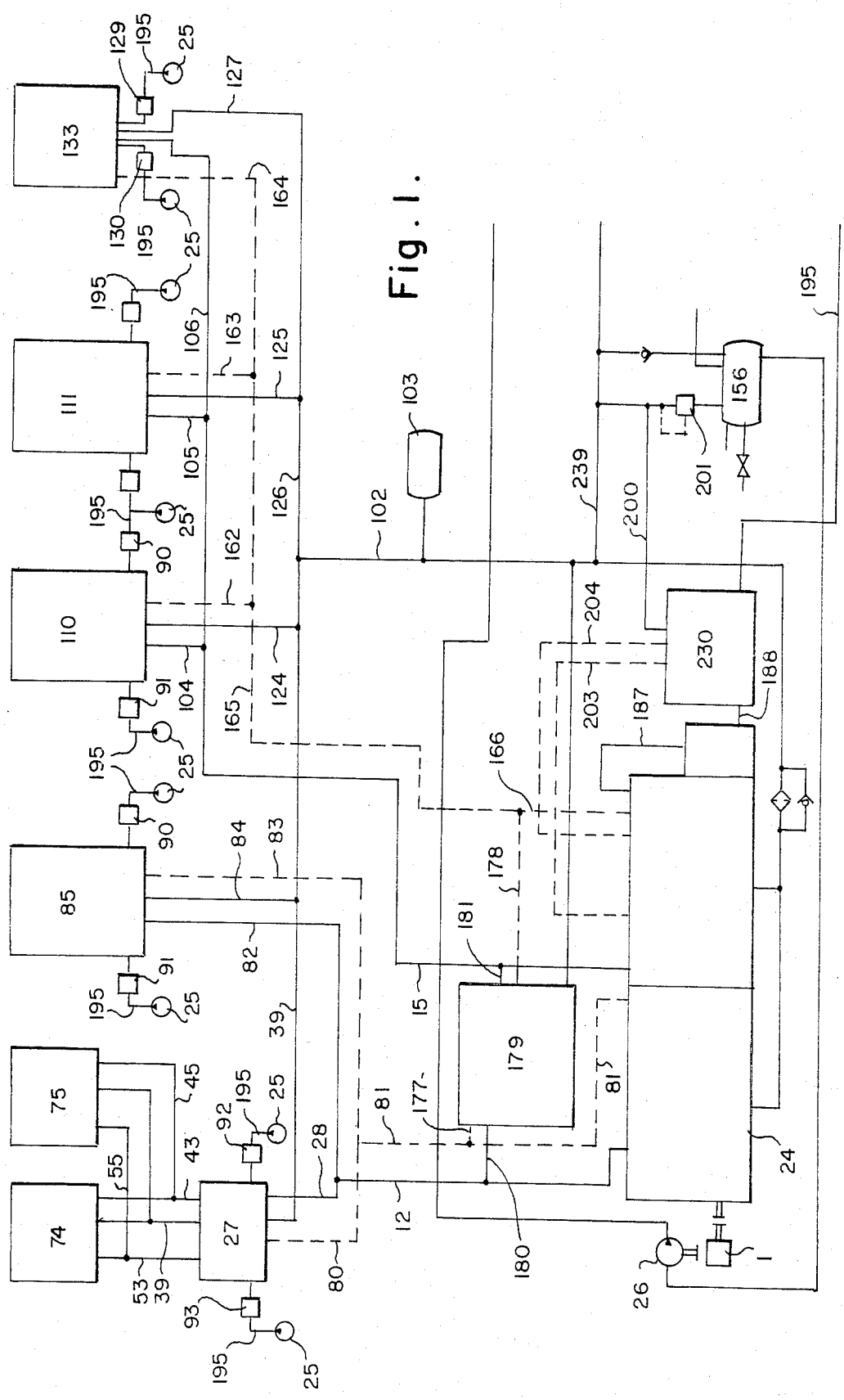
FIG. 1 shows an overall circuit diagram and the other Figures show the circuit diagrams for the individual components designated only in rough outline in the overall view according to FIG. 1.
Figure 2:
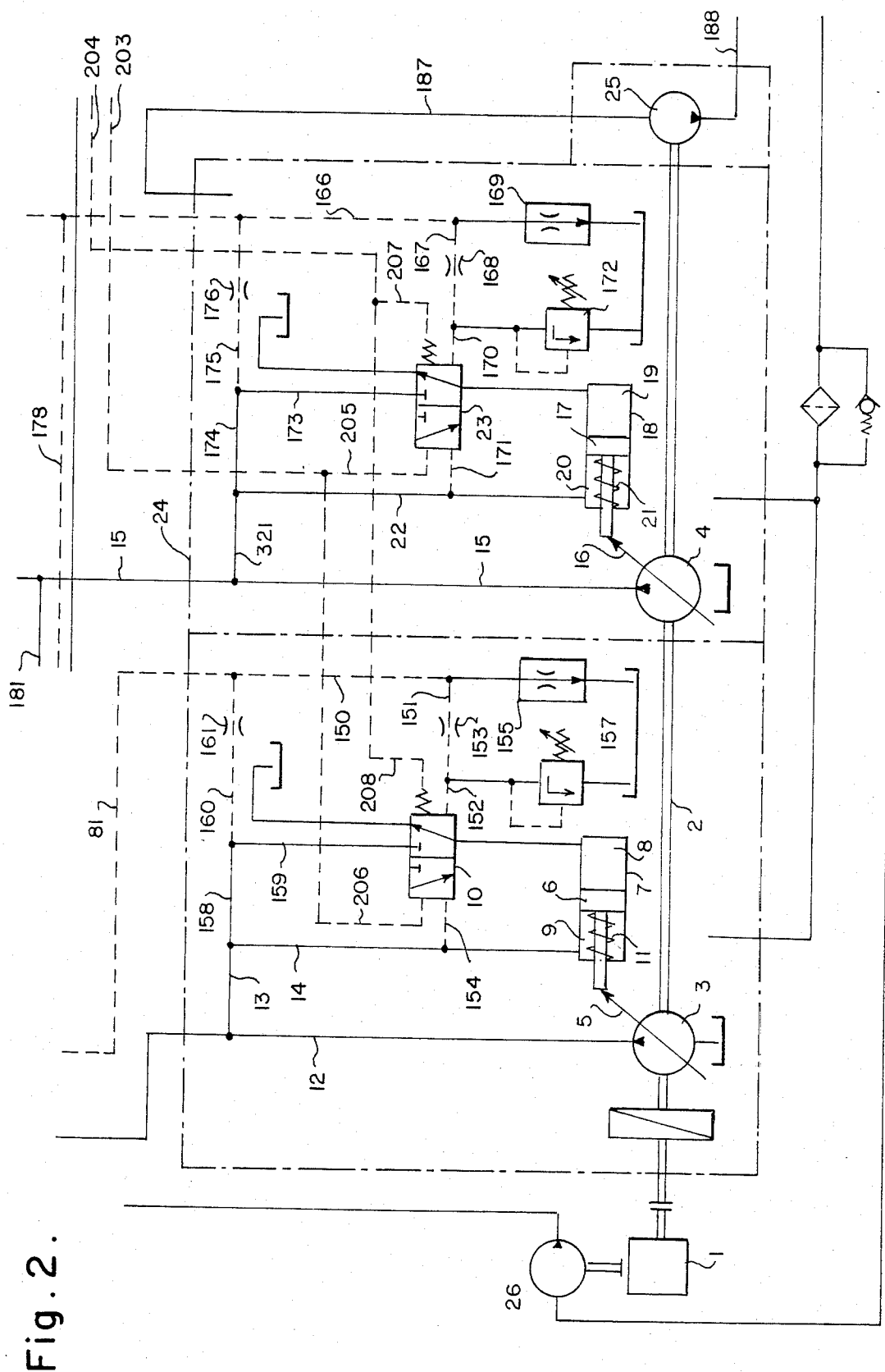
FIG. 2 shows the circuit diagram for the double-pump unit 24.
Figure 3:
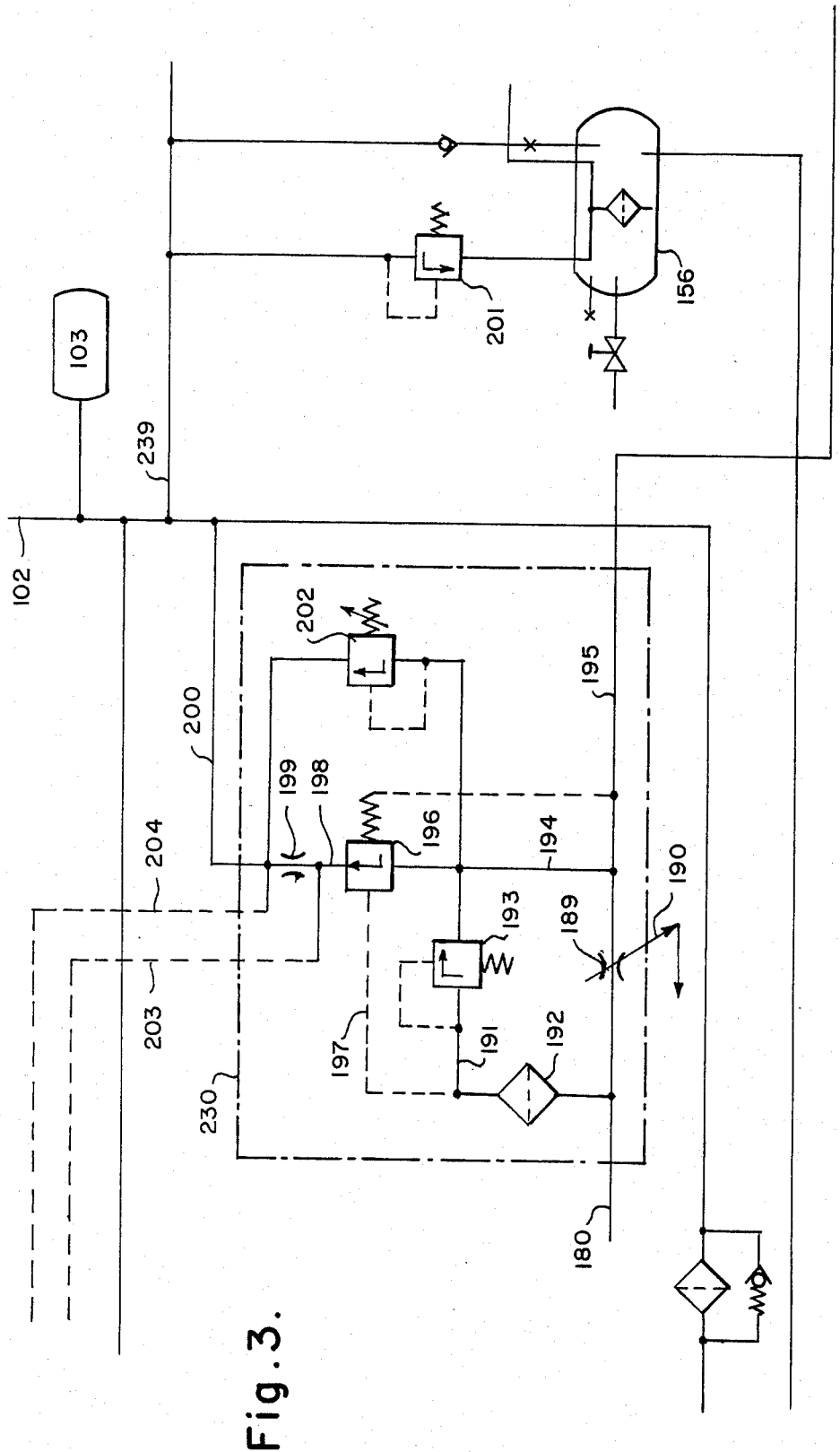
FIG. 3 shows the piping diagram for the maximum-load control unit 230.
Figure 4:
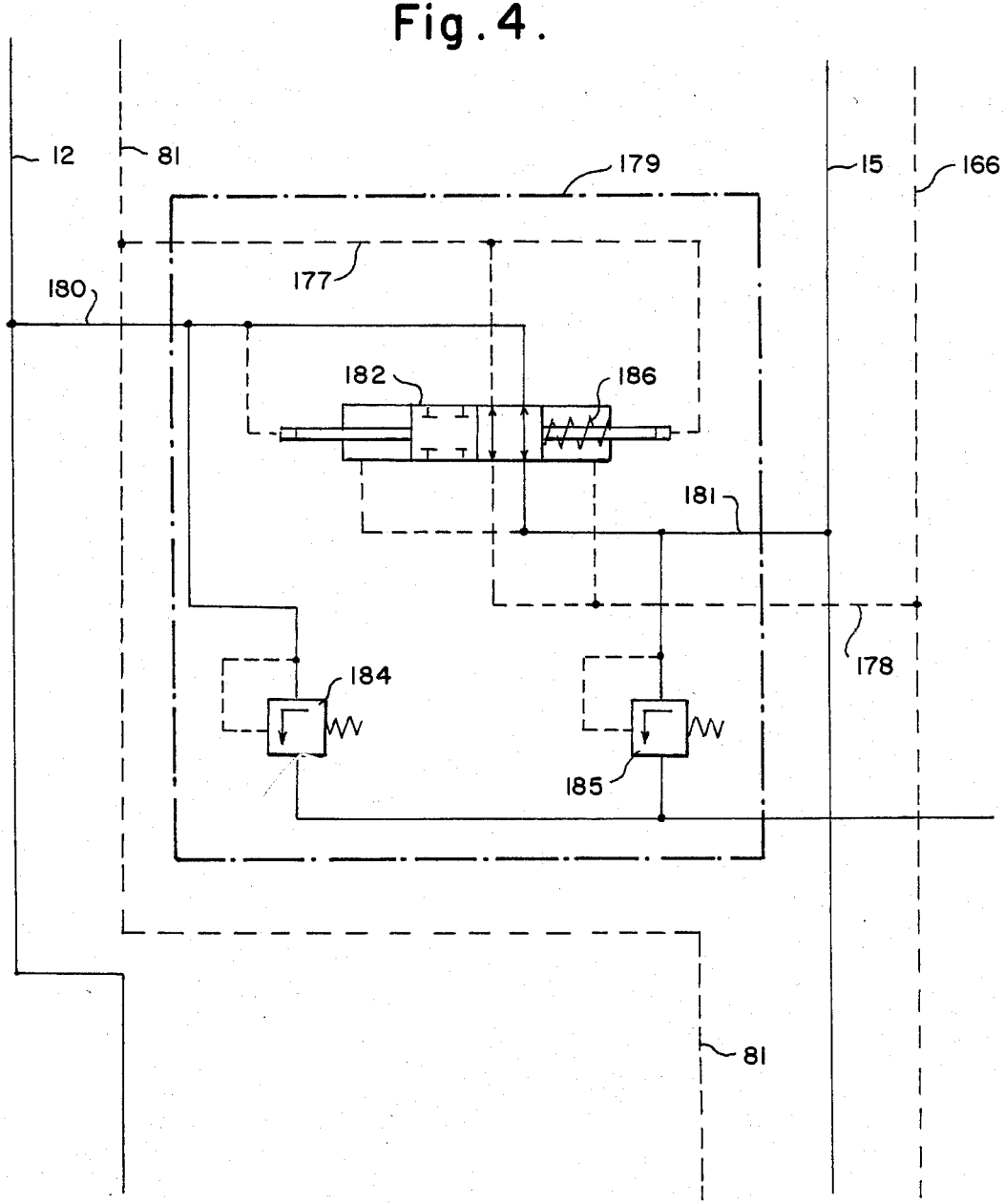
FIG. 4 shows the circuit diagram for the coupling unit 179.
Figure 5:
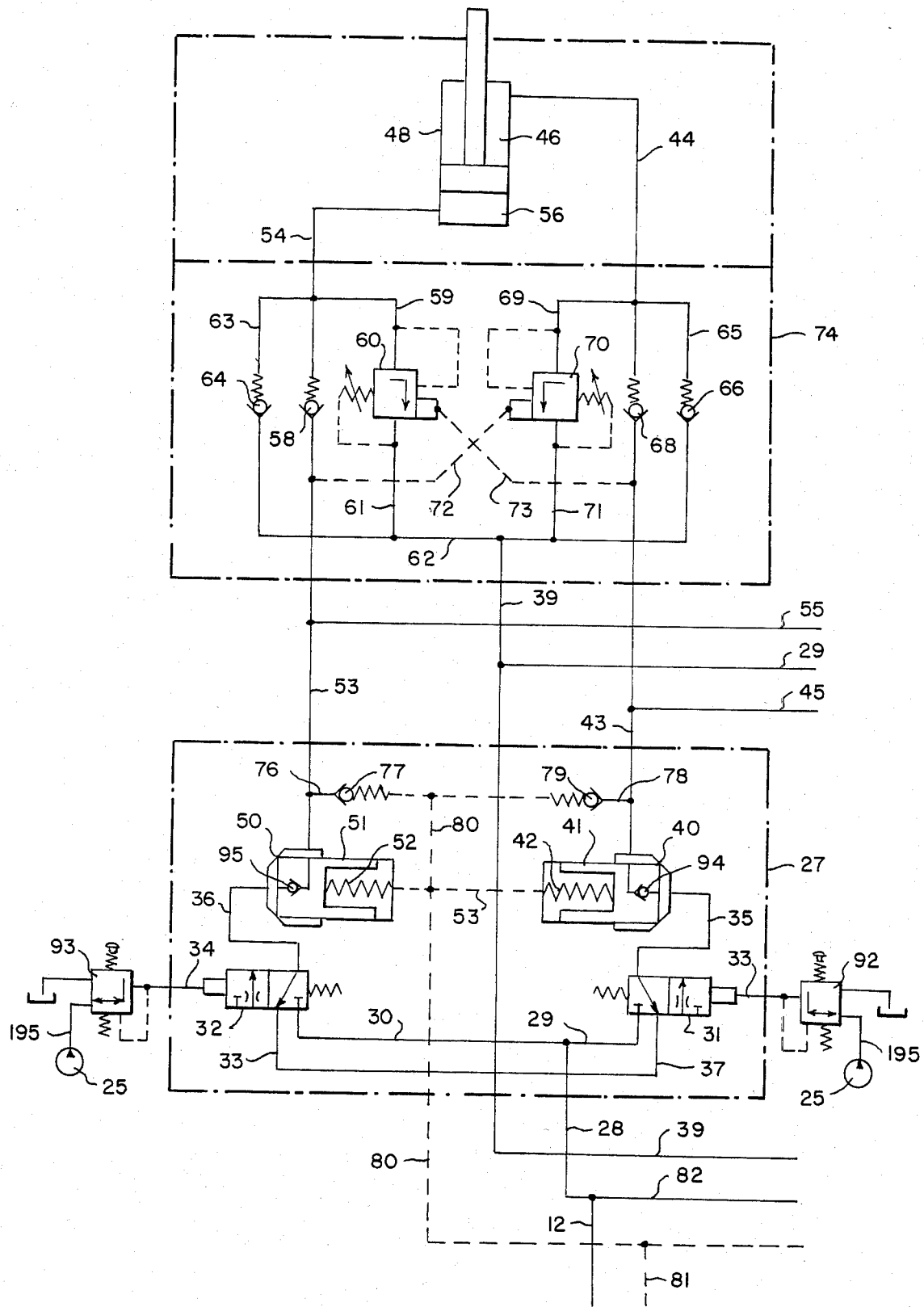
FIG. 5 shows the circuit diagram for the partial control unit 27 for the control unit 74.
Figure 6:
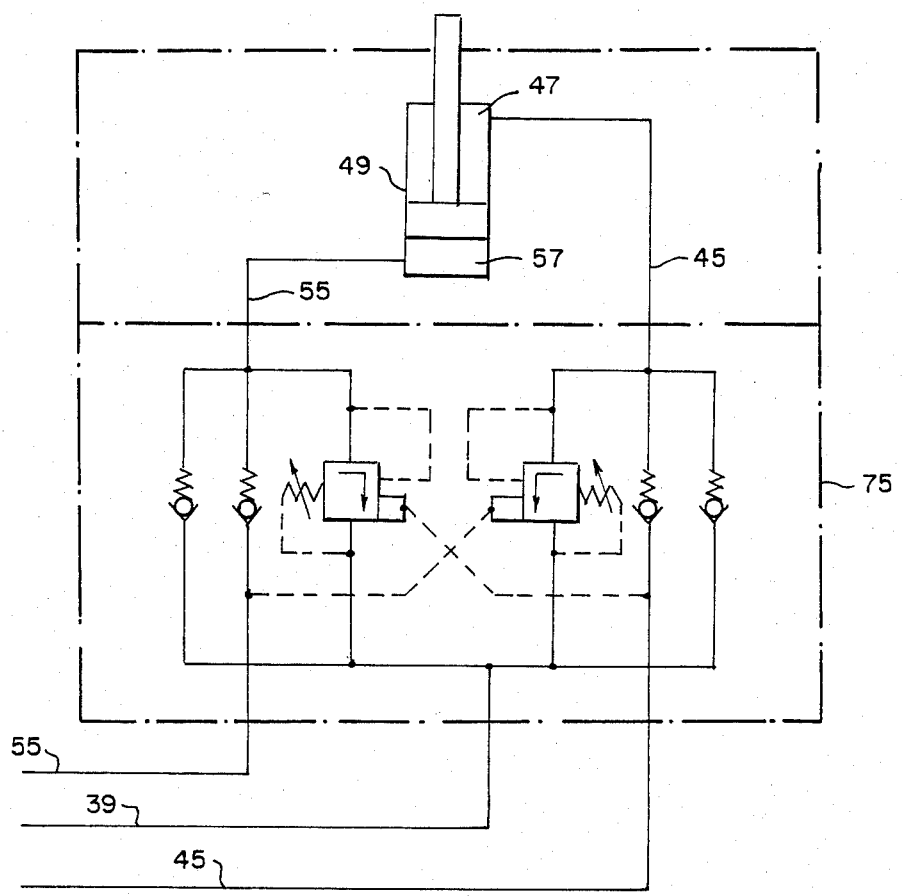
FIG. 6 shows the circuit diagram for the control unit 74 or 75 with the assigned consumer.

The coupling unit 279 corresponds essentially to the coupling unit 179, in which case the 4-connection/2-position valve 282 corresponds essentially to valve 182. A branch line 180 coming from the delivery line 12 and opposite it a coupling control line 177 coming from the control line 81 are connected to the valve 282 also in the same manner as to the valve 182, and a branch line 181 coming from the delivery line 15 is also connected, and a coupling control line 178 coming from the control pressure line 166 is connected to the opposite control pressure chamber In contrast to valve 182, valve 183 has a third control pressure chamber 234 on the side opposite the pressure spring 286. This chamber 234 is connected through a line 233 to the maximum-load regulating unit 230 such that if the latter sends a signal to the servo control valves 10 and 23, by which the final control element 5 of pump 3 and the final control element 16 of pump 4 are shifted in the direction toward a smaller stroke volume, the coupling valve 282 is prevented from opening. A pressure is thus exerted by the maximum-load regulating unit 230 through the control line 233 on the additional pressure chamber 234 that loads the valve element of the coupling valve 282 in the direction to the closed position. The coupling unit 279 is to connect the two delivery lines 12 and 15 of the two pumps 5 and 4 together only if one of the two pumps is set at the maximum possible delivery flow and the pressure gradient at the single-edge servo valve spool 32 acting as the metering restrictor drops below the predetermined value. This pressure gradient at the single-edge slide valve 31 acting as a metering restrictor is, however, also less if the maximum-load regulator 230 engages, with the result that the stroke volume of the pump 4 or 5 is set at a smaller value than the pressure gradient at the metering estrictor. A coupling unit of the form shown in FIG. 4 responds, however, to any drop in the pressure gradient at the single-edge servo valve spool 31 acting as a metering restrictor, with the result that the delivery lines 12 and 15 are also then connected if the drop is induced only through the engagement of the maximum-load regulator 230. In order to avoid this shortcoming, the switching-pressure difference at which the coupling unit 279 exerts its coupling function is reduced by loading the third pressure chamber 234 to the same degree as the pressure gradient at the single-edge servo valve spool 31 acting as a metering restictor is reduced by the signal from the maximum-load control 230.

In the foregoing specification I have set out certain preferred practices and embodiments of my invention, however, it will be understood that this invention may be otherwise embodied within the scope of the following claims.

I claim:

1. In a control for a hydrostatic drive system with a primary energy source and with at least two adjustable pumps driven by a common power source and at least one adjustable consumer of hydrostatic energy and with a pump adjusting piston connected with the adjusting element of each of the at least two pumps and capable of sliding in a pump adjustment cylinder, where the load on the pump adjustment cylinder of each of the at least two pumps is regulated by means of a separate servo control valve, and a constant pump connected to and driven by the power source in common with said at least two adjustable pumps; a delivery line connected to and receiving fluid from said constant pump, a restrictor in said delivery line, a signal-pressure line connected to the delivery line in front of the restrictor, a control-signal line connected to each servo control valve, a relief valve jet in said control-signal line and connected to and regulated by said signal pressure line, the improvement characterized in that the control-signal line is bifurcated between the relief valve jet and each servo control valve and an additional restrictor is located in the bifurcated control-signal line to provide a pressure gradient and means are provided for operatively connecting the two sides of the bifurcated signal line to the separate servo control valves whereby to control the loading of the pump adjusted cylinder.

2. A control, particularly in accordance with claim 1, for a drive system in which an arbitrarily adjustable metering restrictor is located in the delivery line between the pump and the consumer and where the adjusting element of the servo control valve of the pump adjustment device is acted upon, on the one hand, by the pressure in front of the said metering restrictor and, on the other hand, by the pressure beyond this said metering restrictor and a spring, characterized in that the pressure gradient at the restrictor in said one side of the bifurcated control-signal line and the pressure gradient at the metering restrictor act on separate control-pressure spaces of the same servo control valve.

3. A control according to claim 2 for a drive system with at least two pumps, each of which delivers to at least one of the consumers assigned to it, the improvement wherein means are provided whereby the pressure gradient at the restrictor in the control signal line acts on all the servo control valves assigned to one pump.

4. A drive system according to claim 1 or 2 or 3, characterized in that the additional constant pump is the servo control-pressure pump required for generation of the servo control-pressure.

5. A control system according to claim 1 or 2 or 3 or 4, characterized in that the lines connected to the delivery line in front of and beyond the metering restrictor are connected with each other through a circulating restrictor.

6. A control system according to claim 1 or 2 or 3 or 4, characterized in that a drain line containing a flow regulator and leading indirectly to a tank is connected to the control-pressure line connected beyond the metering restrictor, and that the connecting branch line leading to one pressure chamber of the servo control valve branches off in front of this flow regulator.

7. A control system according to claim 6, characterized in that an additional throttle is located in this connecting branch line.

8. A control according to claim 7, in which a relief valve jet is connected to the delivery line, and characterized in that a relief valve jet adjusted to a lower pressure than the relief valve jet connected to the delivery line is connected to the control pressure line between the additional restrictor and the servo control valve, which leads to one pressure space of the servo control valve and branches off beyond the metering restrictor.

* * * * *

UNITED STATES PATENT AND TRADEMARK OFFICE
CERTIFICATE OF CORRECTION

PATENT NO. : 4,495,766
DATED : January 29, 1985
INVENTOR(S) : ALFRED KRUSCHE

It is certified that error appears in the above-identified patent and that said Letters Patent is hereby corrected as shown below:

Column 7, line 25, change "on" to --in--.

Column 9, line 26, after delivery line, insert --15--.

Column 10, line 61, change "16" to --116--.

Column 13, line 66, after the, insert --adjustable restrictor 189 whose regulating unit 190 is in--.

Column 14, line 53, after voir, insert --103--.

Column 14, line 57, after line, insert --102--.

Column 16, line 1, change "estrictor" to --restrictor--.

Signed and Sealed this

Thirteenth Day of August 1985

[SEAL]

Attest:

DONALD J. QUIGG

Attesting Officer          Acting Commissioner of Patents and Trademarks